US012317996B2

(12) United States Patent
Kinoshita

(10) Patent No.: US 12,317,996 B2
(45) Date of Patent: Jun. 3, 2025

(54) ASSEMBLY SHELF

(71) Applicant: DAIFUKU CO., LTD., Osaka (JP)

(72) Inventor: Yukiya Kinoshita, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/460,889

(22) Filed: Sep. 5, 2023

(65) Prior Publication Data

US 2024/0122339 A1   Apr. 18, 2024

(30) Foreign Application Priority Data

Oct. 13, 2022 (JP) ................................. 2022-165035

(51) Int. Cl.
A47B 47/00 (2006.01)
A47B 87/02 (2006.01)

(52) U.S. Cl.
CPC ...... *A47B 47/0091* (2013.01); *A47B 87/0207* (2013.01)

(58) Field of Classification Search
CPC ............ A47B 47/0091; A47B 87/0207; A47B 87/005; A47B 87/0284; A47B 47/0083; A47B 47/021; A47B 47/028; A47B 87/02; A47B 87/0215; A47B 87/0253; B65G 1/02
USPC ......... 211/188, 194; 108/53.1; 206/503, 509
See application file for complete search history.

(56) References Cited

U.S. PATENT DOCUMENTS

| 2,506,844 | A | * | 5/1950 | Smith ................... A47B 87/02 211/1 |
| 2,732,967 | A | * | 1/1956 | Metcalf ................. B65D 19/12 220/6 |
| 3,653,734 | A | * | 4/1972 | Ungaro ................ A47B 88/906 206/509 |
| 3,762,343 | A | * | 10/1973 | Thacker ................ B65D 19/38 108/53.5 |
| 3,861,327 | A | * | 1/1975 | Silson .................. A47B 47/042 108/190 |
| 4,934,636 | A | * | 6/1990 | Orlosky .................. B65B 67/12 248/95 |
| 5,154,310 | A | * | 10/1992 | Massey .................. B65D 19/44 206/505 |
| 5,172,816 | A | * | 12/1992 | Kline ........................ A47F 7/08 211/37 |
| 5,186,338 | A | * | 2/1993 | Boutet ................. G03B 42/045 206/509 |
| 5,222,610 | A | * | 6/1993 | Johansen .............. A47F 7/0028 211/69.5 |
| 5,477,594 | A | * | 12/1995 | LePage ................. E04H 13/006 211/84 |

(Continued)

FOREIGN PATENT DOCUMENTS

JP          3128281 U       1/2007

*Primary Examiner* — Jennifer E. Novosad
(74) *Attorney, Agent, or Firm* — Harness, Dickey & Pierce, P.L.C.

(57) ABSTRACT

An assembly shelf is configured by stacking a second shelf unit on a first shelf unit. An upper surface of at least one first horizontal frame member which is disposed in an upper part of the first shelf unit and a lower surface of at least one second horizontal frame member which is disposed in a lower part of the second shelf unit are respectively provided with engagement structures that engage with each other.

6 Claims, 5 Drawing Sheets

(56) References Cited

U.S. PATENT DOCUMENTS

| | | | | |
|---|---|---|---|---|
| 5,588,372 | A * | 12/1996 | Kelly | B65D 19/385 |
| | | | | 108/55.1 |
| 6,213,315 | B1 * | 4/2001 | Forney | B65B 69/0083 |
| | | | | 211/85.15 |
| 6,520,095 | B1 * | 2/2003 | Hayes | A47B 87/0207 |
| | | | | 108/190 |
| 10,822,142 | B2 * | 11/2020 | Zuzak | B65D 19/08 |
| 11,214,401 | B1 * | 1/2022 | Emmitt | B65D 19/385 |
| 11,523,687 | B2 * | 12/2022 | Koetter, Jr. | B65D 19/44 |
| 2002/0063100 | A1 * | 5/2002 | Kwang | G11B 33/0483 |
| | | | | 211/41.12 |
| 2002/0162815 | A1 * | 11/2002 | Wang | A47F 7/08 |
| | | | | 211/37 |
| 2006/0272556 | A1 * | 12/2006 | Apps | B65D 19/004 |
| | | | | 108/53.1 |
| 2016/0081472 | A1 * | 3/2016 | Aleisa | A47B 47/0091 |
| | | | | 211/188 |
| 2020/0247580 | A1 * | 8/2020 | Zuzak | B65D 19/385 |
| 2022/0386772 | A1 * | 12/2022 | Tabujara | A47B 47/0091 |
| 2023/0337815 | A1 * | 10/2023 | Banner | A47B 47/047 |
| 2023/0337817 | A1 * | 10/2023 | Boardman | A47B 83/001 |
| 2024/0122339 | A1 * | 4/2024 | Kinoshita | A47B 47/0091 |

* cited by examiner

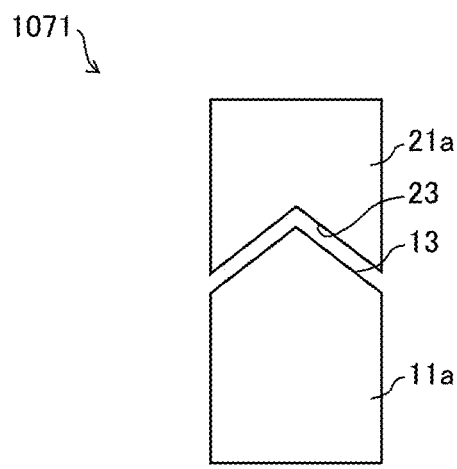
FIG. 7a
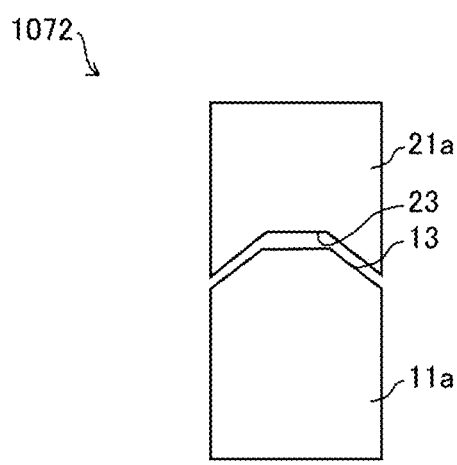
FIG. 7b
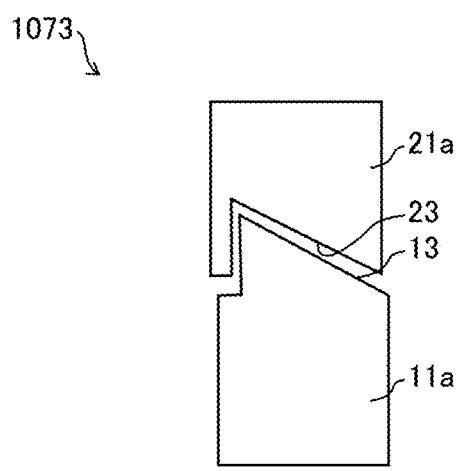
FIG. 7c
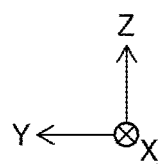

ASSEMBLY SHELF

This Nonprovisional application claims priority under U.S.C. § 119 on Patent Application No. 2022-165035 filed in Japan on Oct. 13, 2022, the entire contents of which are hereby incorporated by reference.

Technical Field

The present invention relates to an assembly shelf that is used by connecting a plurality of shelf units.

Background Art

For example, as disclosed in Patent Literature 1, there is an assembly shelf configured by connecting a plurality of shelf units. The assembly shelf in the conventional technique is assembled by stacking an upper shelf unit on a lower shelf unit and coupling lateral plane frames of the shelf units with each other. The shelf units are connected by aligning a joint hole in the lateral plane frame of the lower shelf unit with an embedded nut in the lateral plane frame of the upper shelf unit, inserting a connecting bolt from below the joint hole, screwing the tip of the connecting bolt into the embedded nut, and tightening and fixing the connecting bolt.

CITATION LIST

Patent Literature

[Patent Literature 1]
Japanese Registered Utility Model Publication No. 3128281

Summary of Invention

Technical Problem

In order to connect the upper and lower shelf units together, it is necessary to accurately align the upper and lower shelf units during assembly. However, it takes some time for such alignment, and therefore there has been a limitation in improving efficiency of an operation to assemble an assembly shelf. An object of an aspect of the present disclosure is to realize an assembly shelf which makes it possible to efficiently carry out alignment for connecting a plurality of shelf units together.

Solution to Problem

In order to attain the object, an assembly shelf in accordance with an aspect of the present disclosure includes: a first shelf unit having a plurality of first vertical frame members that extend in an up-and-down direction and a plurality of first horizontal frame members that extend in a horizontal direction; and a second shelf unit having a plurality of second vertical frame members that extend in the up-and-down direction and a plurality of second horizontal frame members that extend in the horizontal direction, the assembly shelf being configured by stacking the second shelf unit on the first shelf unit, an upper surface of at least one of the plurality of first horizontal frame members which is disposed in an upper part of the first shelf unit and a lower surface of at least one of the plurality of second horizontal frame members which is disposed in a lower part of the second shelf unit being respectively provided with engagement structures that engage with each other.

Advantageous Effects of Invention

According to an aspect of the present disclosure, it is possible to easily carry out alignment in connecting a plurality of shelf units.

BRIEF DESCRIPTION OF DRAWINGS

FIG. 7*a* is a cross-sectional view for describing a first engagement structure in an assembly shelf in accordance with Variation 2;

FIG. 7*b* is a cross-sectional view for describing a second engagement structure in an assembly shelf in accordance with Variation 2; and FIG. 7*c* is a cross-sectional view for describing a third engagement structure in an assembly shelf in accordance with Variation 2.

DESCRIPTION OF EMBODIMENTS

Embodiment

The following description will discuss details of an embodiment of the present disclosure. In the present embodiment, an assembly shelf is exemplified, which is installed in a factory or a warehouse, and in which articles (such as a raw material, a semifinished product, a product, and a jig tool) which are transferred by an automatic transfer system can be placed for temporary or long-term storage.

In order to make it possible to store a large amount of articles, it is usual for such an assembly shelf to be configured such that articles can be placed at a high position that is normally inaccessible by an operator. However, the application of the present disclosure is not necessarily limited to an assembly shelf which is installed in a factory or a warehouse, and an assembly shelf in which articles are placed by an automatic transfer system.

<Overview of Assembly Shelf>

Figure 1:
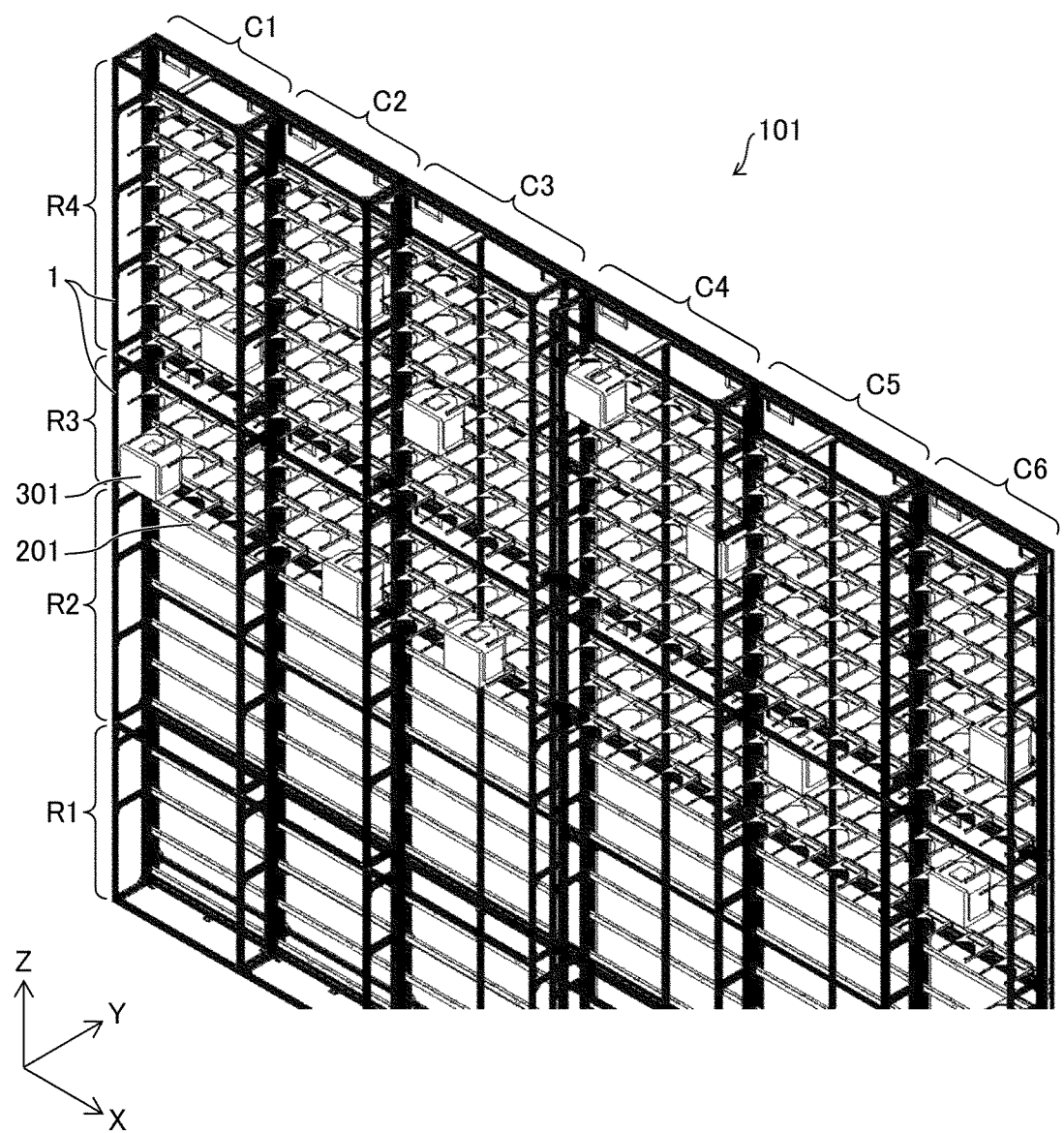
FIG. 1 is a perspective view illustrating an assembly shelf in accordance with an embodiment.

FIG. 1 is a perspective view illustrating an assembly shelf 101 in accordance with the present embodiment, where the assembly shelf 101 is seen from front and obliquely above. Here, the assembly shelf 101 is configured, for example, by stacking shelf units 1 in four rows (R1 through R4) vertically (i.e., in a Z-axis direction). Furthermore, in the assembly shelf 101, the shelf units 1 are combined in 6 columns (C1 through C6) horizontally (i.e., in parallel with an X-axis). As such, FIG. 1 exemplifies the assembly shelf configured by a combination of the shelf units 1 which are arranged in a matrix of 6 (horizontally)×4 (vertically). Note, however, that application of the present disclosure is not limited to such a configuration.

Each of the shelf unit 1 is provided with a plurality of shelf boards 201 on which an article 301 is to be placed so as to be stored in the assembly shelf 101. In FIG. 1, accommodation cases that have a regular shape and accommodate a semifinished product or the like are indicated as an example of the article 301. Examples of such accommodation cases having the regular shape include accommodation cases called a front-opening unified pod (FOUP) and a front open shipping box (FOSB).

In FIG. 1, for easy understanding of a frame structure of the shelf unit 1, shelf boards 201 to be attached to the shelf units 1 in the first row (R1) and the second row (R2) are not illustrated. Here, the shelf board 201 means a supporting member that can hold each article 301 to be stored. A most typical form of the shelf board is a planar plate. However, the shelf board in accordance with the present application is not limited to the form of planar plate. FIG. 1 illustrates, as an example of the article 301, accommodation cases that have a regular shape. FIG. 1 also illustrates the shelf boards 201 each of which is in the form of comb such that a plurality of articles 301 (accommodation cases) can be placed thereon by supporting each of the accommodation cases at parts near three sides of a substantially rectangular bottom surface of that accommodation case.

In the present application, directions are defined as follows. In an XYZ coordinate system, an X-axis and a Y-axis are defined to be parallel with the horizontal plane, a Z-axis is defined to be parallel with the vertical line, and a positive direction of the Z-axis is defined to be the upward direction. As such, the Z-axis direction can be referred to also as the up-and-down direction. Assuming that the assembly shelf 101 is in a state of being installed on a floor surface which is the horizontal plane, the Z-axis direction is defined to be the vertical direction of the assembly shelf 101, and the X-axis direction is defined to be a longitudinal direction of the assembly shelf 101 on the horizontal plane and is also referred to as a lateral direction.

The positive direction of the Y-axis is defined to be a direction from the front to the back of the installed assembly shelf 101. That is, the positive direction of the Y-axis is a direction in which an article 301 is moved when the article 301 is placed on the shelf board 201. The negative direction side of the Y-axis of the assembly shelf 101 is the front side of the assembly shelf 101, and the positive direction side of the Y-axis is the rear side of the assembly shelf 101. Therefore, when the installed assembly shelf 101 is seen from the front, the positive direction of the X-axis is the right side.

<Frame Structure of Shelf Unit>

Figure 2:
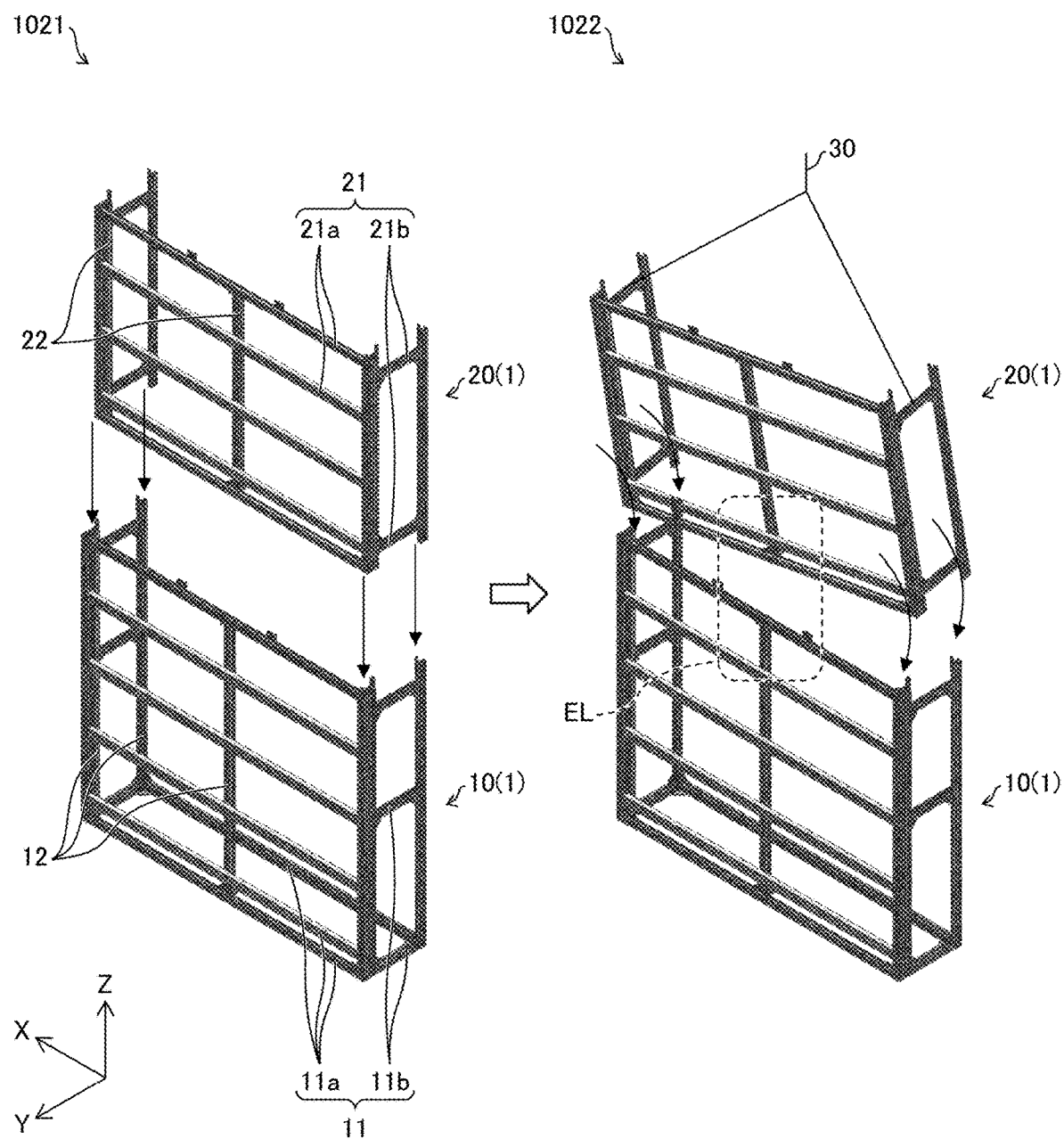
FIG. 2 is a diagram for describing steps of assembling the assembly shelf in accordance with the embodiment.

FIG. 2 is a perspective view illustrating the assembly shelf 101 seen from the rear side and obliquely above, for describing steps of assembling the assembly shelf 101. FIG. 2 illustrates a situation in which, on one shelf unit 1 in the assembly shelf 101, another shelf unit 1 is stacked.

In the following description, for convenience, a shelf unit 1 that is positioned at the lower side after stacking is referred to as a first shelf unit 10, and a shelf unit 1 that is positioned at the upper side after stacking is referred to as a second shelf unit 20. In FIG. 2, an exploded view 1021 illustrates a part of the assembly shelf 101 including the first shelf unit 10 and the second shelf unit 20.

The first shelf unit 10 includes a plurality of first vertical frame members 12 that extend in the up-and-down direction (vertical direction, Z-axis direction) and a plurality of first horizontal frame members 11 that extend in the horizontal direction. The vertical frame member may be referred to as a "post", and the horizontal frame member may be referred to as a "beam". Here, the first horizontal frame members 11 encompass a longer first horizontal frame member 11*a* and a shorter first horizontal frame member 11*b*. The longer first horizontal frame member 11*a* extends in the lateral direction (X-axis direction), and the shorter first horizontal frame member 11*b* extends in the depth direction (Y-axis direction).

The first vertical frame member 12 and the first horizontal frame member 11 are preferably made of metallic materials. From the viewpoint of being lightweight and firm, it is particularly preferable that the first vertical frame member 12 and the first horizontal frame member 11 are each constituted by an aluminum extruded member in the form of having a plurality of voids and grooves along the extending direction (axial direction) of the frame member. Note, however, that the first vertical frame member 12 and the first horizontal frame member 11 may each be constituted by, for example, a steel member.

The first vertical frame member 12 and the first horizontal frame member 11 are connected to each other at each connecting part by a known appropriate method. For example, a metal fitting such as a corner metal fitting, a bolt, and the like may be used to connect and fix the first vertical frame member 12 and the first horizontal frame member 11 together at each connecting part. Alternatively, at each of the connecting parts, the first vertical frame member 12 and the first horizontal frame member 11 may be joined together by welding or the like. Four ridges in the up-and-down direction of the first shelf unit 10 forming a substantially rectangular parallelepiped as a whole are respectively constituted by the first vertical frame members 12.

On a left lateral plane of the first shelf unit 10, shorter first horizontal frame members 11*b* connect two first vertical frame members 12 at positions near the upper end and near the lower end, and thus a left lateral plane frame is constituted. As illustrated in FIG. 2, in order to enhance strength, the left lateral plane frame may include an additional shorter first horizontal frame member 11*b* that connect the two first vertical frame members 12 at another position in the up-and-down direction. On a right lateral plane of the first shelf unit 10, a right lateral plane frame is also constituted in a similar manner.

On a rear plane (i.e., a lateral plane at the rear side (positive direction side of the Y-axis)) of the first shelf unit 10 forming a substantially rectangular parallelepiped as a whole, longer first horizontal frame members 11*a* connect two first vertical frame members 12 at positions near the upper end and near the lower end, and thus a rear plane frame is constituted. In this configuration, the rear plane frame and the left lateral plane frame share one first vertical frame member 12. Similarly, the rear plane frame and the right lateral plane frame share one first vertical frame member 12.

As illustrated in FIG. 2, in order to enhance strength, the rear plane frame may include an additional longer first horizontal frame member 11*a* that connect the two first vertical frame members 12 at another position in the up-and-down direction (Z-axis direction). Furthermore, in order to enhance strength against a load particularly in the up-and-down direction, the rear plane frame may include a first vertical frame member 12 that is provided at a position other than both ends in the longitudinal direction (lateral direction).

In the case illustrated in FIG. 2, more specifically, the first shelf unit 10 includes five first vertical frame members 12, six shorter first horizontal frame members 11b, and seven longer first horizontal frame members 11a. The length of the shorter first horizontal frame member 11b corresponds to the depth (i.e., the length in the Y-axis direction) of the first shelf unit 10. The length of the longer first horizontal frame member 11a corresponds to the width (i.e., the length in the X-axis direction) of the first shelf unit 10.

Among the five first vertical frame members 12, three first vertical frame members 12 are disposed so as to be adjacent to each other in the lateral direction (X-axis direction) on the rear plane of the first shelf unit 10. The remaining two first vertical frame members 12 are disposed so as to be adjacent, in the negative direction of the Y-axis, to respective two first vertical frame members 12 which are included in the three first vertical frame members 12 disposed so as to be adjacent to each other in the X-axis direction and which are positioned at the both sides.

In each of the left lateral plane frame and the right lateral plane frame, three shorter first horizontal frame members 11b are disposed so as to be adjacent to each other in the vertical direction (Z-axis direction) between two first vertical frame members 12 which are disposed so as to be adjacent to each other in the Y-axis direction. Six longer first horizontal frame members 11a are disposed so as to be adjacent to each other in the vertical direction (Z-axis direction) in the rear plane frame.

The remaining one longer first horizontal frame member 11a connects lower ends of first vertical frame members 12 at the front side (negative direction side of the Y-axis) among first vertical frame members 12 included in the right lateral plane frame and first vertical frame members 12 included in the left lateral plane frame. That is, the remaining one longer first horizontal frame member 11a is disposed so as to be adjacent in the negative direction of the Y-axis to the lowest longer first horizontal frame member 11a among the six longer first horizontal frame members 11a which are disposed so as to be adjacent to each other in the Z-axis direction.

As such, the first shelf unit 10 employs the structure in which most of the first horizontal frame members 11 are disposed on the rear side, and few first horizontal frame members 11 are disposed on the front side at which articles 301 are put in and taken out. Therefore, the center of gravity of the first shelf unit 10 is closer to the rear plane of the first shelf unit 10 in the depth direction (Y-axis direction).

The second shelf unit 20 includes a plurality of second vertical frame members 22 that extend in the up-and-down direction and a plurality of second horizontal frame members 21 that extend in the horizontal direction. Here, the second horizontal frame members 21 encompass a longer second horizontal frame member 21a and a shorter second horizontal frame member 21b. The longer second horizontal frame member 21a extends in the lateral direction (X-axis direction), and the shorter second horizontal frame member 21b extends in the depth direction (Y-axis direction). The second shelf unit 20 also has a frame structure constituted by a left lateral plane frame, a rear plane frame, and a right lateral plane frame, in a manner similar to that of the first shelf unit 10.

In the case illustrated in FIG. 2, more specifically, the second shelf unit 20 includes five second vertical frame members 22, four shorter second horizontal frame members 21b, and five longer second horizontal frame members 21a. Among the five second vertical frame members 22, three second vertical frame members 22 are disposed so as to be adjacent to each other in the lateral direction (X-axis direction) on the rear plane of the second shelf unit 20. The remaining two second vertical frame members 22 are disposed so as to be adjacent, in the negative direction of the Y-axis, to respective two second vertical frame members 22 which are included in the three second vertical frame members 22 disposed so as to be adjacent to each other in the X-axis direction and which are positioned at the both sides.

In each of the left lateral plane frame and the right lateral plane frame, two shorter second horizontal frame members 21b are disposed so as to be adjacent to each other in the vertical direction (Z-axis direction) between two second vertical frame members 22 which are disposed so as to be adjacent to each other in the Y-axis direction. Five longer second horizontal frame members 21a are disposed so as to be adjacent to each other in the vertical direction (Z-axis direction) in the rear plane frame.

As such, the second shelf unit 20 employs the structure in which many second horizontal frame members 21 are disposed on the rear side, and no second horizontal frame member 21 is disposed on the front surface side at which articles 301 are put in and taken out. Therefore, the center of gravity of the second shelf unit 20 is closer to the rear plane of the second shelf unit 20 in the depth direction (Y-axis direction).

Each of the shelf units (first shelf unit 10 and second shelf unit 20) has the frame structure including the left lateral plane frame, the rear plane frame, and the right lateral plane frame, each of which is configured as described above. Therefore, each of the shelf units is relatively lightweight and strong. Therefore, it is possible to construct an assembly shelf by stacking a plurality of shelf units in the up-and-down direction.

<Shelf Unit Stacking Operation>

Next, the following description will discuss an operation to assemble an assembly shelf 101 for installation at a site such as a factory or a warehouse. Needless to say, for the assembly shelf 101, it is desirable to shorten the period of time for the installation operation because such shortening of the installation period leads to shortening of a period and reduction in cost for start-up of a factory or the like.

The assembly shelf 101 in accordance with the embodiment is configured such that installation can be carried out in a short period of time by bringing pre-assembled shelf units 1 to a site, and completing the assembly of the shelf units 1. In addition, since each of the shelf units 1 is constituted by a frame structure so as to be strong and relatively lightweight, efficiency of assembly operation is also improved.

In FIG. 2, an explanatory view 1022 illustrates a situation of an operation to stack the second shelf unit 20 on the first shelf unit 10. Here, an operation is shown in which the second shelf unit 20 is stacked on the first shelf unit 10 while carrying out alignment of the lifted second shelf unit 20 with the first shelf unit 10.

As illustrated in FIG. 2, when the second shelf unit 20 is lifted, it is appropriate to apply non-slip measures to shorter second horizontal frame members 21b at the uppermost parts of the left lateral plane frame and the right lateral plane frame of the second shelf unit 20, and wind a rope 30. As a specific example, at least an end portion of the rope 30 may be provided with a loop, and the rope 30 may be wound around the shorter second horizontal frame member 21b so that the main portion of the rope 30 passes through the loop. With this manner, when the second shelf unit 20 is lifted, the rope 30 is tightened so as to constrict the shorter second horizontal frame members 21b. Therefore, it is possible to prevent the rope 30 from slipping during lifting.

As described above, the center of gravity of the second shelf unit 20 is closer to the rear side. Therefore, when the second shelf unit 20 is lifted, the rear side tends to be lowered and inclined, as compared with a state in which the second shelf unit 20 is installed. That is, the second shelf unit 20 tends to incline to a state in which the second shelf unit 20 is slightly rotated around the X-axis from the positive direction of the Z-axis to the positive direction of the Y-axis from a state of being disposed horizontally.

Therefore, in placing the second shelf unit 20 on the first shelf unit 10 by lowering the rope, first, a longer second horizontal frame member 21a at the lowermost part of the rear plane frame comes into contact with a longer first horizontal frame member 11a at the uppermost part of the rear plane frame of the first shelf unit 10. When the rope is then further lowered, the first shelf unit 10 and the other predetermined parts of the second shelf unit 20 also come into contact with each other.

In this case, provided that the alignment between the longer second horizontal frame member 21a and the longer first horizontal frame member 11a that come into contact with each other first is accurately carried out, the second shelf unit 20 is placed on the first shelf unit 10 at the correct position. After that, a conventional method may be applied to couple the second shelf unit 20 to the first shelf unit 10.

For example, the shelf units 1 can be connected to each other as follows: that is, a connecting bolt that passes through a corresponding joint hole provided in a first horizontal frame member 11 at the uppermost part of the first shelf unit 10 is screwed, tightened, and fixed to an embedded nut provided in an arbitrary second horizontal frame member 21 at the lowermost part of the second shelf unit 20. Alternatively, it is possible that each of frame members to be connected to each other is provided with a joint hole which is a through hole, and a connecting bolt is passed through these joint holes, and the connecting bolt is tightened and fixed with a nut for the connection.

<Engagement Structure>

As described above, the first horizontal frame member 11 of the first shelf unit 10 and the second horizontal frame member 21 of the second shelf unit 20 are coupled together, and thus the assembly shelf 101 is firmly constituted. In order to efficiently assemble the assembly shelf 101, it is preferable that alignment between the second shelf unit 20 and the first shelf unit 10 can be carried out easily in stacking.

In view of this, in the assembly shelf 101 in accordance with the present embodiment, an upper surface of at least one first horizontal frame member 11 which is disposed in an upper part of the first shelf unit 10 and a lower surface of a second horizontal frame member 21 which is disposed in a lower part of the second shelf unit 20 are respectively provided with engagement structures that engage with each other. In other words, a first engagement structure is provided on the upper surface of the first horizontal frame member 11, a second engagement structure is provided on the lower surface of the second horizontal frame member 21, and the first engagement structure and the second engagement structure are engaged with each other.

According to the arrangement, when the second shelf unit 20 is stacked on the first shelf unit 10, the engagement structures are engaged with each other, and thus it is possible to easily carry out positioning. In the assembly shelf 101 illustrated in FIG. 1, these engagement structures are provided at connecting parts in the up-and-down direction for each of the shelf units 1.

The engagement structures for positioning are provided in horizontal frame members that come into contact with each other first in stacking operation. Therefore, as described above, the second shelf unit 20 is placed on the first shelf unit 10 at the correct position. Therefore, it is preferable that an engagement structure 23 of the second shelf unit 20 is provided in a second horizontal frame member 21 (longer second horizontal frame member 21a) which is provided at the lower part of the second shelf unit and which extends along the rear plane of the second shelf unit 20.

Similarly, it is preferable that an engagement structure 13 of the first shelf unit 10 is provided to a first horizontal frame member 11 to be coupled to the second horizontal frame member 21. That is, it is preferable that the engagement structure 13 of the first shelf unit 10 is provided to the first horizontal frame member 11 (longer first horizontal frame member 11a) which is provided at the upper part of the first shelf unit 10 and which extends along the rear plane of the first shelf unit 10.

In other words, the engagement structure 23 of the second shelf unit 20 is preferably provided in a second horizontal frame member 21 that is included in second horizontal frame members 21 extending along a periphery in the lower part of the second shelf unit 20 and that is closest to the center of gravity of the second shelf unit 20. The second horizontal frame member 21 (longer second horizontal frame member 21a), which is the second horizontal frame member 21 provided with the engagement structure and which extends along the rear plane of the second shelf unit 20, is an example of the second horizontal frame member 21 provided to extend from one lateral plane to the other lateral plane of the second shelf unit 20.

The first horizontal frame member 11 (longer first horizontal frame member 11a), which is the first horizontal frame member 11 provided with the engagement structure and which extends along the rear plane of the first shelf unit 10, is an example of the first horizontal frame member 11 provided to extend from one lateral plane to the other lateral plane of the first shelf unit 10. That is, the first horizontal frame member 11 and the second horizontal frame member 21 which are provided with the engagement structures are preferably horizontal frame members that extend in the longitudinal direction in the first shelf unit 10 and the second shelf unit 20, respectively.

Figure 3:
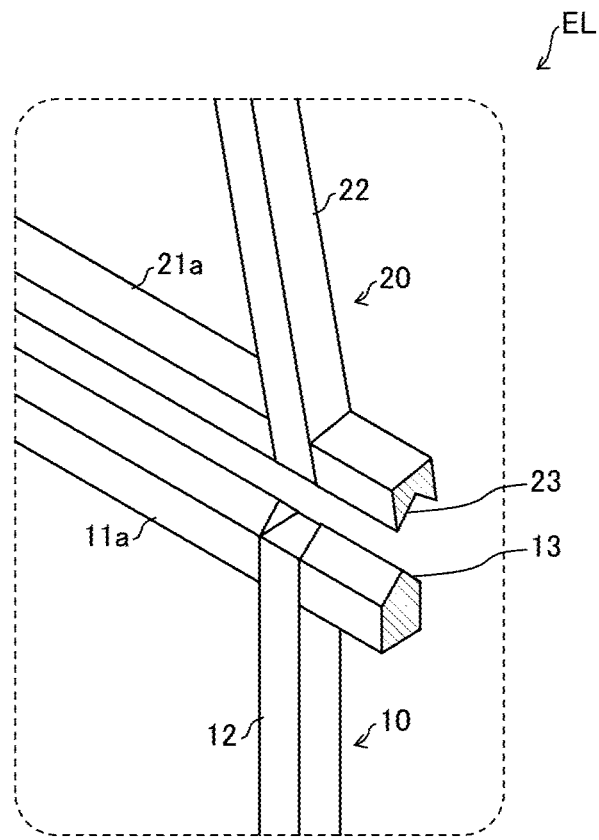
FIG. 3 is an enlarged view illustrating a part of an engagement structure in the assembly shelf in accordance with the embodiment.
Figure 4:
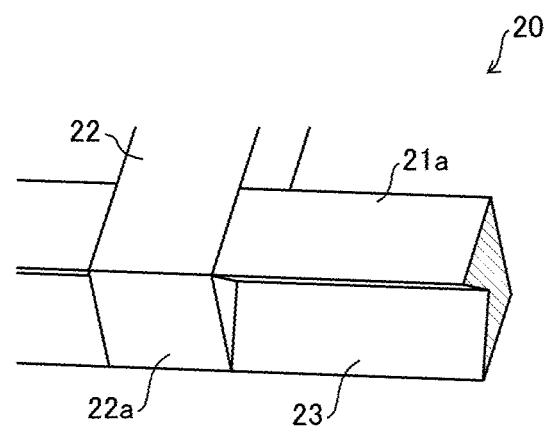
FIG. 4 is a perspective view illustrating an engagement structure in a second shelf unit of the assembly shelf in accordance with the embodiment.
Figure 4:
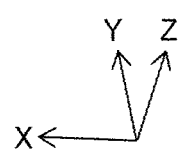
Figure 5:
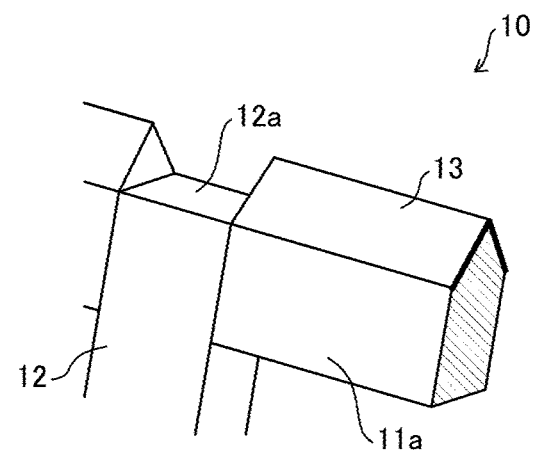
FIG. 5 is a perspective view illustrating an engagement structure in a first shelf unit of the assembly shelf in accordance with the embodiment.
Figure 5:
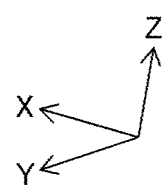

FIG. 3 is a diagram illustrating the engagement structure 13 of the first shelf unit 10 and the engagement structure 23 of the second shelf unit 20. FIG. 3 is an enlarged view illustrating a part indicated by the reference sign "EL" in the explanatory view 1022 in FIG. 2. FIG. 4 is a diagram illustrating the engagement structure 23 in the second shelf unit 20. FIG. 4 is a perspective view illustrating a structure in which a bottom surface side of the longer second horizontal frame member 21a is particularly illustrated. FIG. is a perspective view illustrating the engagement structure 13 in the first shelf unit 10. In FIGS. 3 through 5, parts of the longer first horizontal frame member 11a and the longer second horizontal frame member 21a are illustrated while being cut in order to indicate cross-sectional shapes thereof.

The engagement structure 23 of the second shelf unit has a groove structure (valley shape) formed on a bottom surface of the longer second horizontal frame member 21a along the longitudinal direction. The engagement structure 13 of the first shelf unit 10 is a ridge structure that is formed along the longitudinal direction on an upper surface of the longer first horizontal frame member 11a. The groove structure of the engagement structure 23 and the ridge structure of the engagement structure 13 are formed so as to fit and engage with each other. When these structures engage with each other, positions of the engagement structure 13 and the engagement structure 23 are fixed to each other in the depth direction (Y-axis direction).

In the case illustrated in FIGS. 3 through 5, more specifically, the groove structure of the engagement structure 23 is in the form provided with a recess having a triangular cross section (in particular, a recess having an isosceles triangular cross section) on the bottom surface of the longer second horizontal frame member 21a. The ridge structure of the engagement structure 13 is in the form in which the upper surface of the longer first horizontal frame member 11a is provided with a projecting structure having a triangular cross section (in particular, a projecting structure having an isosceles triangular cross section).

As such, the engagement structures 13 and 23 have inclined planes that incline with respect to the horizontal plane. Furthermore, each of the engagement structures 13 and 23, having the triangular cross section as described above, has a plurality of inclined planes each of which inclines in a direction around an axis of the corresponding longer first horizontal frame member 11a or longer second horizontal frame member 21a. Note that the inclined plane which inclines in a direction around the axis of the corresponding first horizontal frame member 11a or longer second horizontal frame member 21a means that the inclined plane inclines with respect to the horizontal plane in a state of being parallel with the axis (X-axis) of the corresponding first horizontal frame member 11a or longer second horizontal frame member 21a.

As illustrated in FIG. 4, in the engagement structure 23, a flat bottom surface may be further provided instead of the groove structure (recess) on a part of the bottom surface of the longer second horizontal frame member 21a in the longitudinal direction. In the engagement structure 13, as illustrated in FIG. 5, a flat surface is formed on the upper surface side of a part of the longer first horizontal frame member 11a in the longitudinal direction instead of the ridge structure (projecting structure) so as to correspond to the flat portion of the engagement structure 23.

That is, it is possible to employ a configuration in which the flat portion is provided on the bottom surface of the longer second horizontal frame member 21a such that a part of the groove structure is interrupted and the groove is filled, and that portion engages with a portion of the longer first horizontal frame member 11a in which the ridge structure (projecting structure) is not provided. In a case where the engagement structure 23 and the engagement structure 13 further include such portions, positions of the engagement structures 23 and 13 are fixed also in the lateral direction (X-axis direction).

In the engagement structure 23, as described above, the groove structure has a plurality of inclined planes that incline with respect to the horizontal plane and around the axis of the longer second horizontal frame member 21a. Therefore, in the engagement structure 23, an inclined plane may be formed at a boundary between the flat portion and the groove structure, the inclined plane inclining with respect to the horizontal plane and in a direction that is different from the direction around the axis of the longer second horizontal frame member 21a. As in the case of FIG. 4, the boundary may be a vertical plane that is perpendicular to the axial direction of the second horizontal frame member 21 in which the engagement structure 23 is provided. Note that the inclined plane which inclines in a direction different from the direction around the axis of the second horizontal frame member 21a means that the inclined plane inclines with respect to the horizontal plane in a state of being parallel with a direction (e.g., Y-axis) other than the direction parallel with the axis (X-axis) of the second horizontal frame member 21a.

In the engagement structure 13, as described above, the ridge structure has a plurality of inclined planes that incline with respect to the horizontal plane and around an axis of the longer first horizontal frame member 11a. Therefore, in the engagement structure 13, an inclined plane may be formed at a boundary between the flat portion and the ridge structure, the inclined plane inclining with respect to the horizontal plane and in a direction that is different from the direction around the axis of the longer first horizontal frame member 11a. Note that the inclined plane which inclines in a direction different from the direction around the axis of the first horizontal frame member 11a means that the inclined plane inclines with respect to the horizontal plane in a state of being parallel with a direction (e.g., Y-axis) other than the direction parallel with the axis (X-axis) of the first horizontal frame member 11a. As in the case of FIG. 5, the boundary may be a vertical plane that is perpendicular to the axial direction of the first horizontal frame member 11 in which the engagement structure 13 is provided.

With the inclined plane which inclines in a direction that is different from the direction around the axis of the second horizontal frame member 21 in the engagement structure 23 or the inclined plane which inclines in a direction that is different from the direction around the axis of the first horizontal frame member 11 in the engagement structure 13, it is possible to determine mutual positions of these horizontal frame members in the axial direction, and it is possible to carry out alignment in the axial direction of the horizontal frame members.

The flat portion (an end surface 22a described later is an example thereof) which is a part of the engagement structure 23 in which the groove structure is interrupted, and the flat portion (an end surface 12a described later is an example thereof) which is a part of the engagement structure 13 in which the ridge structure is interrupted are configured to come into contact with each other in a state in which the second shelf unit 20 and the first shelf unit 10 are connected to each other.

Such a structure for carrying out alignment in the lateral direction in the engagement structure 23 may be provided in accordance with an arrangement of the second vertical frame members 22 constituting the second shelf unit 20. For example, in the rear plane frame of the second shelf unit 20, as illustrated in FIG. 4, at least one second vertical frame member 22 is provided to pass through the longer second horizontal frame member 21a at the lower part. The end surface 22a at the lower end of the second vertical frame member 22 is disposed so as not to protrude from the lower surface (on which the engagement structure 23 is formed) of the longer second horizontal frame member 21a. Thus, the above-described flat portion in which the groove structure is interrupted is constituted.

Meanwhile, in the rear plane frame of the first shelf unit 10, a first vertical frame member 12 at a position to abut on the second vertical frame member 22 is provided so as to pass through the longer first horizontal frame member 11a at the upper part, as illustrated in FIG. 5. The end surface 12a at the upper end of the first vertical frame member 12 is disposed at a lower side than the engagement structure 13 of the longer first horizontal frame member 11a. Thus, the above-described flat portion in which the ridge structure is interrupted is constituted.

The end surface 22a of the second vertical frame member 22 and the end surface 12a of the first vertical frame member 12 need to be configured such that the engagement structure 23 of the second horizontal frame member 21 and the engagement structure 13 of the first horizontal frame member 11 come into contact with each other in a state of being engaged with each other. As such, the assembly shelf 101 is configured such that the second vertical frame member 22 and the first vertical frame member 12 at the position to abut on the second vertical frame member 22 come into contact with each other. With the configuration, when the shelf units 1 are stacked, and further an article 301 is placed, the assembly shelf 101 can support loads.

Variation 1

The following description will discuss an example of a variation of the assembly shelf 101 in accordance with the present embodiment. Variation 1 is similar to the foregoing assembly shelf 101 in accordance with the present embodiment, except that a part of the configuration of the engagement structure 13 in the first shelf unit 10 is changed.

Figure 6:
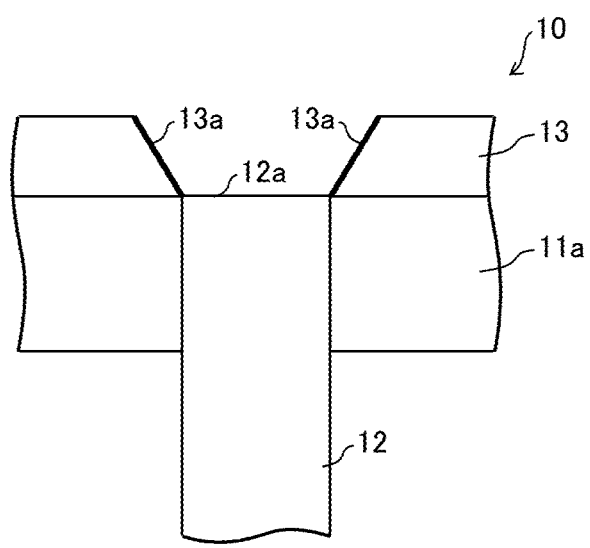
FIG. 6 is a rear view illustrating an engagement structure in a first shelf unit of an assembly shelf in accordance with Variation 1.
Figure 6:
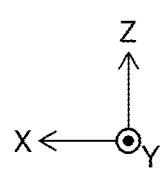

FIG. 6 is a rear view (seen in the Y-axis direction) illustrating an enlarged part of the engagement structure 13 of the first shelf unit 10. In Variation 1, in the engagement structure 13 of the first shelf unit 10, the portion of the upper surface of the longer first horizontal frame member 11a where the ridge structure is interrupted has a tapered shape which upwardly becomes wider. A slope 13a forming the tapered shape is an example of the inclined plane that inclines with respect to the horizontal plane and in a direction that is different from the direction around the axis of the longer second horizontal frame member 21a.

Therefore, during alignment in the stacking operation, there is an allowance for alignment in the lateral direction (X-axis direction). In other words, it is possible to easily carry out alignment in the lateral direction (X-axis direction). As the second shelf unit 20 is lowered toward the first shelf unit 10, the foregoing flat portion in which the groove structure is interrupted in the engagement structure 23 of the second shelf unit 20 is guided in the lateral direction along the tapered shape. Therefore, when the second shelf unit 20 is ultimately stacked on the first shelf unit 10, the alignment is uniquely achieved also in the lateral direction. Therefore, in the assembly shelf in Variation 1, it is possible to more efficiently carry out an operation to align upper and lower shelf units 1.

<Variation 2>

Variation 2 is similar to the foregoing assembly shelf 101 in accordance with the present embodiment, except that a part of the configuration of the engagement structure 13 in the first shelf unit 10 and a part of the configuration of the engagement structure 23 in the second shelf unit 20 are changed.

FIG. 7 is a cross-sectional view that is taken perpendicularly to the lateral direction (X-axis direction) and illustrates the engagement structure 23 in the second shelf unit 20 and the engagement structure 13 in the first shelf unit 10. The reference sign 1071 indicates a case in the foregoing assembly shelf 101 in accordance with the present embodiment for comparison. The reference sign 1072 indicates a case in an assembly shelf of an aspect of Variation 2. The reference sign 1073 indicates a case in an assembly shelf of another aspect of Variation 2.

As indicated by the reference sign 1071, in the foregoing assembly shelf 101 in accordance with the present embodiment, the engagement structure 13 includes the ridge structure having the isosceles triangular cross section with two slopes at a cross sectional position. Moreover, the engagement structure 23 includes the groove structure that engages with the ridge structure of the engagement structure 13.

In the foregoing assembly shelf 101 in accordance with the present embodiment, the first shelf unit 10 and the second shelf unit 20 are guided by the engagement structures 13 and 23 and are thus properly aligned even if there is a slight deviation in the position in the depth direction (Y-axis direction) when the second shelf unit 20 is stacked on the first shelf unit 10. That is, even if the positional deviation in the Y-axis direction (depth direction) is in the positive direction of the Y-axis or in the negative direction of the Y-axis, the alignment can be properly carried out, provided that the positional deviation is up to approximately half of the thickness of the longer second vertical frame member 22 in the Y-axis direction.

Meanwhile, as indicated by the reference sign 1072, in the assembly shelf in accordance with Variation 2, the engagement structure 13 includes a ridge structure having a trapezoidal cross section with two slopes and one horizontal plane at a cross sectional position. Moreover, the engagement structure 23 includes a groove structure that engages with the ridge structure of the engagement structure 13. According to this Variation 2, by disposing an embedded nut for connecting shelf units at a position in the horizontal plane of the engagement structure 23, it is possible to reliably provide the embedded nut in the longer second vertical frame member 22.

As indicated by the reference sign 1073, in the assembly shelf in accordance with another aspect of Variation 2, the engagement structure 13 includes a ridge structure having a right triangular cross section with one long slope, one vertical plane, and one horizontal plane at a cross sectional position. The slope extends over almost the entire thickness of the longer second vertical frame member 22 in the Y-axis direction, and the horizontal plane has a narrow terrace shape that is connected to the lower part of the vertical plane. Moreover, the engagement structure 23 includes a groove structure that engages with the ridge structure of the engagement structure 13.

In the assembly shelf in accordance with this aspect of Variation 2, the first shelf unit 10 and the second shelf unit are guided by the engagement structures 13 and 23 and are thus properly aligned even if there is a slight deviation in the position in the depth direction (Y-axis direction) when the second shelf unit 20 is stacked on the first shelf unit 10. That is, if the positional deviation in the Y-axis direction (depth direction) is one of the positive direction of the Y-axis and the negative direction of the Y-axis, the alignment can be properly carried out, provided that the positional deviation is up to approximately the thickness of the longer second vertical frame member 22 in the Y-axis direction.

Aspects of the present invention can also be expressed as follows:

An assembly shelf according to aspect 1 of the present disclosure includes: a first shelf unit having a plurality of first vertical frame members that extend in an up-and-down direction and a plurality of first horizontal frame members that extend in a horizontal direction; and a second shelf unit having a plurality of second vertical frame members that extend in the up-and-down direction and a plurality of second horizontal frame members that extend in the horizontal direction, the assembly shelf being configured by stacking the second shelf unit on the first shelf unit, an upper surface of at least one of the plurality of first horizontal frame members which is disposed in an upper part of the first shelf unit and a lower surface of at least one of the plurality of second horizontal frame members which is disposed in a lower part of the second shelf unit being respectively provided with engagement structures that engage with each other.

According to the aspect, it is possible to easily carry out alignment in connecting a plurality of shelf units.

In the assembly shelf according to aspect 2 of the present disclosure, in the aspect 1: the at least one of the plurality of first horizontal frame members which is provided with the engagement structure and the at least one of the plurality of second horizontal frame members which is provided with the engagement structure are each provided to extend from one lateral plane to the other lateral plane of the first shelf unit or the second shelf unit. According to the aspect, it is possible to easily carry out alignment, in particular, in the depth direction of the shelf units.

In the assembly shelf according to aspect 3 of the present disclosure, in the aspect 1 or 2: in the second shelf unit, the engagement structure is provided in a second horizontal frame member that extends along a rear plane of the second shelf unit. According to the aspect, it is possible to efficiently carry out an operation of stacking shelf units.

In the assembly shelf according to aspect 4 of the present disclosure, in any one of the aspects 1 through 3: in the second shelf unit, the engagement structure is provided in a second horizontal frame member that is included in second horizontal frame members extending along a periphery in the lower part of the second shelf unit and that is closest to a center of gravity of the second shelf unit. According to the aspect, it is possible to efficiently carry out an operation of stacking shelf units.

In the assembly shelf according to aspect 5 of the present disclosure, in any of the aspects 1 through 4: each of the engagement structures has an inclined plane that inclines with respect to a horizontal plane. According to the aspect, shelf units are guided by the inclined plane in stacking, and it is thus possible to efficiently carry out alignment.

In the assembly shelf according to aspect 6 of the present disclosure, in any one of the aspects 1 through 5: each of the engagement structures which are respectively provided in the first shelf unit and the second shelf unit is provided with a plurality of inclined planes each of which inclines with respect to a horizontal plane in a direction around an axis of corresponding one of the plurality of first horizontal frame members and the plurality of second horizontal frame members. According to the aspect, shelf units are guided by the inclined planes in stacking, and it is thus possible to efficiently carry out alignment, in particular, in the horizontal plane extending in a direction perpendicular to the axial direction of these horizontal frame members.

In the assembly shelf according to aspect 7 of the present disclosure, in any one of the aspects 1 through 6: one of the engagement structures which are respectively provided in the first shelf unit and the second shelf unit has a ridge shape extending along corresponding one of the plurality of first horizontal frame members and the plurality of second horizontal frame members, and the other one of the engagement structures has a groove shape extending along corresponding one of the plurality of first horizontal frame members and the plurality of second horizontal frame members. According to the aspect, when shelf units are stacked, it is possible to easily carry out alignment, in particular, in the horizontal plane extending in a direction perpendicular to the axial direction of these horizontal frame members.

In the assembly shelf according to aspect 8 of the present disclosure, in any of the aspects 1 through 7: at least one of the engagement structures which are provided in the first shelf unit and the second shelf unit is provided with an inclined plane which inclines with respect to the horizontal plane in a direction that is different from the direction around the axis of corresponding one of the plurality of first horizontal frame members and the plurality of second horizontal frame members. According to the aspect, it is possible to easily carry out alignment in the axial direction of these horizontal frame members.

The assembly shelf according to aspect 9 of the present disclosure is, in any one of the aspects 1 through 8, constituted by stacking three or more shelf units including the first shelf unit and the second shelf unit. According to the aspect, it is possible to realize an assembly shelf that is suitably installed in a factory or a warehouse.

The present disclosure is not limited to the embodiments, but can be altered variously by a skilled person in the art within the scope of the claims. The present disclosure also encompasses, in its technical scope, any embodiment derived by appropriately combining the disclosed technical means.

REFERENCE SIGNS LIST

1: Shelf unit
10: First shelf unit
11: First horizontal frame member
11a: Longer first horizontal frame member (first horizontal frame member 11)
11b: Shorter first horizontal frame member (first horizontal frame member 11)
12: First vertical frame member
12a: End surface
13: Engagement structure
13a: Slope (inclined plane)
20: Second shelf unit
21: Second horizontal frame member
21a: Longer second horizontal frame member (second horizontal frame member 21)
21b: Shorter second horizontal frame member (second horizontal frame member 21)
22: Second vertical frame member
22a: End surface
23: Engagement structure
30: Rope
101: Assembly shelf
201: Shelf board
301: Article

The invention claimed is:

1. An assembly shelf, comprising:
  a first shelf unit having a plurality of first vertical frame members that extend in an up-and-down direction and a plurality of first horizontal frame members that form a rear side portion and two side portions of the first shelf unit and extend in a horizontal direction; and
  a second shelf unit having a plurality of second vertical frame members that extend in the up-and-down direction and a plurality of second horizontal frame members that form a rear side portion and two side portions of the second shelf unit and extend in the horizontal direction,
  said assembly shelf being configured by stacking the second shelf unit on the first shelf unit, an upper surface of only a first horizontal frame member that forms the rear side portion of the first shelf unit which is disposed in an upper part of the first shelf unit and a lower surface of only a second horizontal frame member that forms the rear side portion of the second shelf unit which is disposed in a lower part of the second shelf unit being respectively provided with engagement structures that engage with each other, wherein no second horizontal frame members are provided on a front surface side of the second shelf unit, the plurality of second horizontal frame members that are provided on a rear plane of the second shelf unit are longer than the plurality of second horizontal frame members that are provided on lateral planes of the second shelf unit, the first horizontal frame member which is provided with the engagement structure is provided on a rear plane of the first shelf unit and is provided to extend from one lateral plane to the other lateral plane of the first shelf unit, and the second horizontal frame member which is provided with the engagement structure is provided on the rear plane of the second shelf unit and is provided to extend from one lateral plane to the other lateral plane of the second shelf unit.

2. The assembly shelf as set forth in claim 1, wherein:
each of the engagement structures has an inclined plane that inclines with respect to a horizontal plane.

3. The assembly shelf as set forth in claim 1, wherein:
each of the engagement structures which are respectively provided in the first shelf unit and the second shelf unit is provided with a plurality of inclined planes each of which inclines with respect to a horizontal plane in a direction corresponding to one of the plurality of first horizontal frame members and the plurality of second horizontal frame members.

4. The assembly shelf as set forth in claim 3, wherein:
at least one of the engagement structures which are provided in the first shelf unit and the second shelf unit is provided with an inclined plane which inclines with respect to the horizontal plane in a direction that is different from the direction around the axis of corresponding one of the plurality of first horizontal frame members and the plurality of second horizontal frame members.

5. The assembly shelf as set forth in claim 1, wherein:
one of the engagement structures which are respectively provided in the first shelf unit and the second shelf unit has a ridge shape extending along corresponding one of the plurality of first horizontal frame members and the plurality of second horizontal frame members, and the other one of the engagement structures has a groove shape extending along corresponding one of the plurality of first horizontal frame members and the plurality of second horizontal frame members.

6. The assembly shelf as set forth in claim 1, which is constituted by stacking three or more shelf units including the first shelf unit and the second shelf unit.

* * * * *